(12) United States Patent
Kuphal

(10) Patent No.: US 9,408,379 B2
(45) Date of Patent: Aug. 9, 2016

(54) BI-DIRECTIONAL BREAK-AWAY BOOM WITH ROLLER AND ROTARY DAMPER

(71) Applicant: AGCO Corporation, Hesston, KS (US)

(72) Inventor: John Kuphal, Jackson, MN (US)

(73) Assignee: AGCO Corporation, Duluth, GA (US)

(*) Notice: Subject to any disclaimer, the term of this patent is extended or adjusted under 35 U.S.C. 154(b) by 80 days.

(21) Appl. No.: 14/509,511

(22) Filed: Oct. 8, 2014

(65) Prior Publication Data

US 2015/0098753 A1    Apr. 9, 2015

Related U.S. Application Data

(60) Provisional application No. 61/888,140, filed on Oct. 8, 2013.

(51) Int. Cl.
| | | |
|---|---|---|
| *A01M 7/00* | (2006.01) | |
| *E05F 1/12* | (2006.01) | |
| *A01C 23/00* | (2006.01) | |

(52) U.S. Cl.
CPC ............ *A01M 7/0078* (2013.01); *A01C 23/008* (2013.01); *A01M 7/0075* (2013.01); *Y10T 16/304* (2015.01); *Y10T 403/32254* (2015.01)

(58) Field of Classification Search
None
See application file for complete search history.

(56) References Cited

U.S. PATENT DOCUMENTS

| | | | | |
|---|---|---|---|---|
| 999,076 | A * | 7/1911 | Willis | A01M 7/0075 137/579 |
| 2,619,379 | A * | 11/1952 | Skifte | A01M 7/0078 239/168 |
| 3,972,476 | A * | 8/1976 | Hall | A01M 7/0053 222/608 |
| 4,441,655 | A * | 4/1984 | Blumhardt | B05B 3/18 239/163 |
| 4,834,249 | A * | 5/1989 | Dahl | A01M 7/0078 212/258 |
| 5,927,606 | A * | 7/1999 | Patterson | A01M 7/0078 239/167 |
| 5,992,759 | A * | 11/1999 | Patterson | A01C 23/00 239/159 |
| 6,007,004 | A * | 12/1999 | Unruh | A01G 25/092 239/69 |
| 6,027,039 | A * | 2/2000 | Mercil | A01M 7/0075 239/159 |
| 6,293,475 | B1 * | 9/2001 | Sobolik | A01M 7/0078 239/159 |
| 6,397,952 | B1 * | 6/2002 | Hundeby | A01B 69/024 172/126 |

(Continued)

*Primary Examiner* — Joshua J Michener
*Assistant Examiner* — Kyle Walraed-Sullivan

(57) ABSTRACT

A break-away apparatus for a boom arm has a main boom portion and a boom tip. The apparatus is positioned at a joint between the main boom portion and the boom tip. The apparatus allows the boom tip to assume a neutral position and to pivot to a forward position and to a rearward position with respect to the main boom portion. The apparatus includes a first plate disposed at the joint, a second plate disposed at the joint, a hinge assembly positioned between the first plate and the second plate, a cam element attached to the first plate, the cam element having an arcuate surface, and a roller attached to the second plate and positioned to roll against the arcuate surface.

11 Claims, 5 Drawing Sheets

(56) References Cited

U.S. PATENT DOCUMENTS

| | | | | |
|---|---|---|---|---|
| 6,719,213 B1* | 4/2004 | Ferguson | A01M 7/0075 | 239/159 |
| 7,431,221 B2* | 10/2008 | Thompson | A01B 73/065 | 239/166 |
| 8,016,043 B2* | 9/2011 | Naylor | A01B 69/024 | 172/126 |
| 8,864,048 B1* | 10/2014 | Light | B05B 1/20 | 239/159 |
| 2004/0231308 A1* | 11/2004 | Murphy | A01D 47/00 | 56/14.9 |
| 2004/0238659 A1* | 12/2004 | Wubben | A01M 7/0075 | 239/166 |
| 2005/0184175 A1* | 8/2005 | Wubben | A01M 7/0078 | 239/722 |
| 2007/0131791 A1* | 6/2007 | Peterson | A01M 7/0078 | 239/166 |
| 2008/0190224 A1* | 8/2008 | Song | B25J 19/063 | 74/40 |
| 2009/0092442 A1* | 4/2009 | Shim | B25J 19/063 | 403/327 |
| 2010/0008751 A1* | 1/2010 | Webb | E02F 3/422 | 414/722 |
| 2011/0081976 A1* | 4/2011 | Lee | B25J 19/06 | 464/37 |
| 2012/0237284 A1* | 9/2012 | Bouten | A01M 7/0078 | 403/111 |
| 2015/0050071 A1* | 2/2015 | Lepper | B60Q 1/0483 | 403/119 |

* cited by examiner

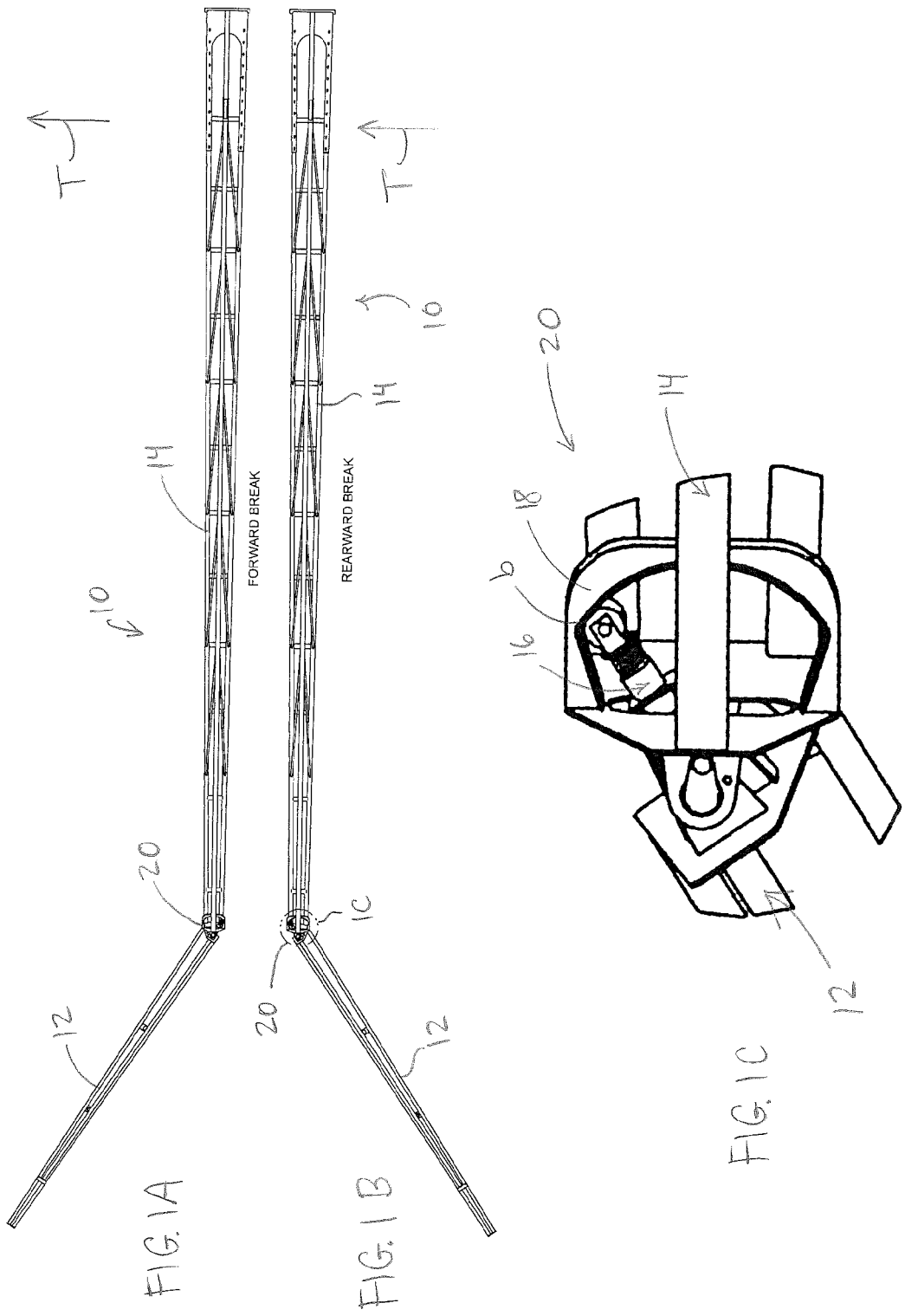

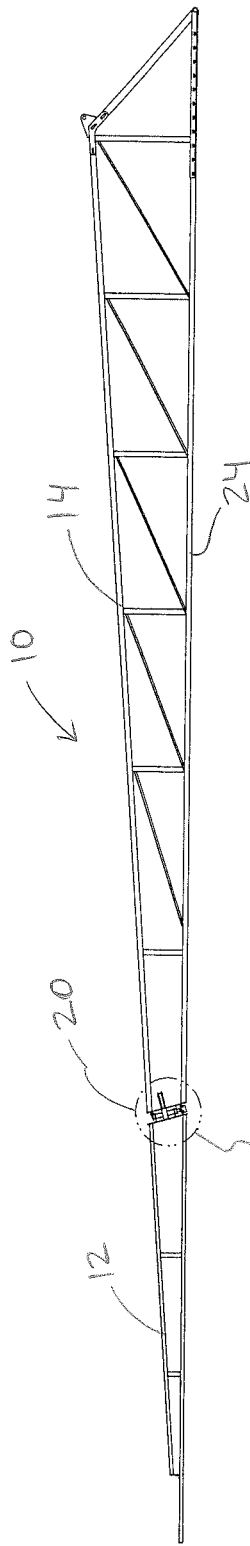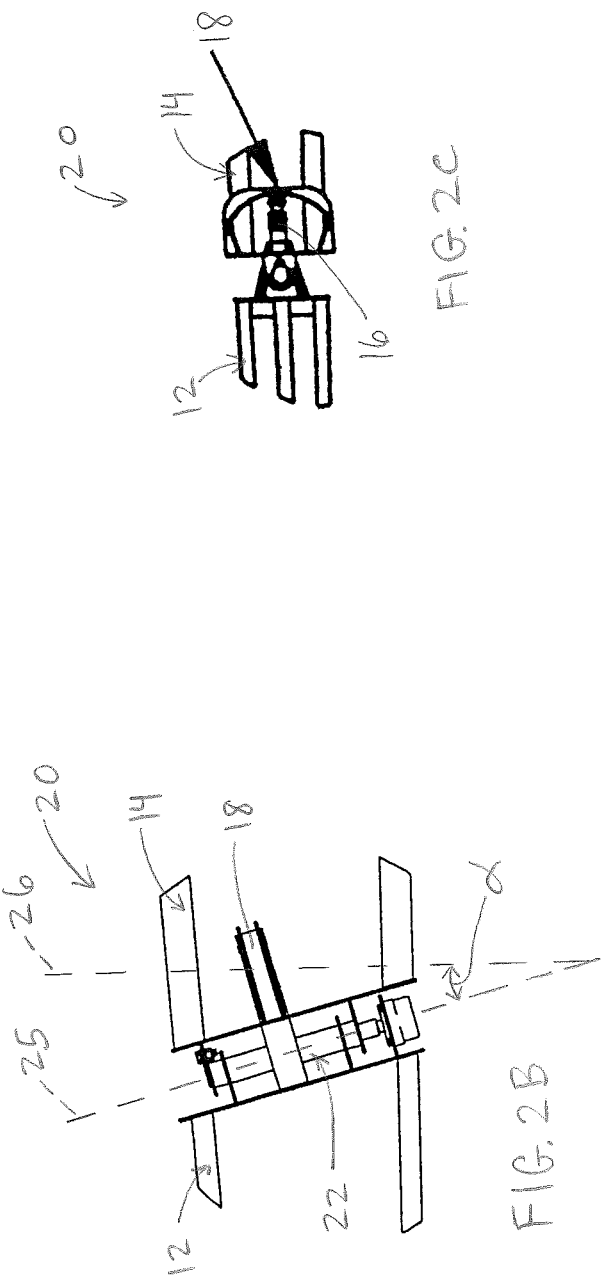

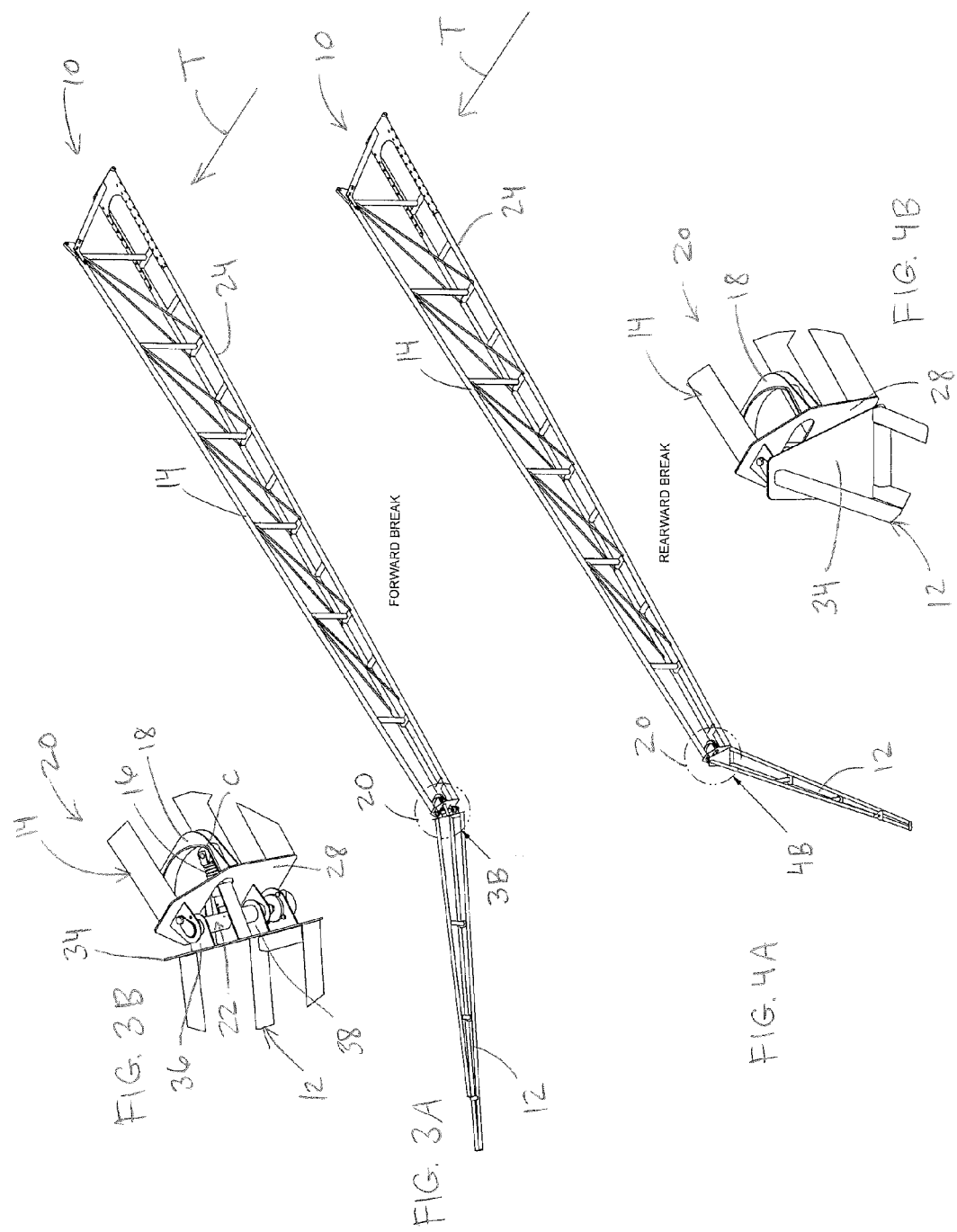

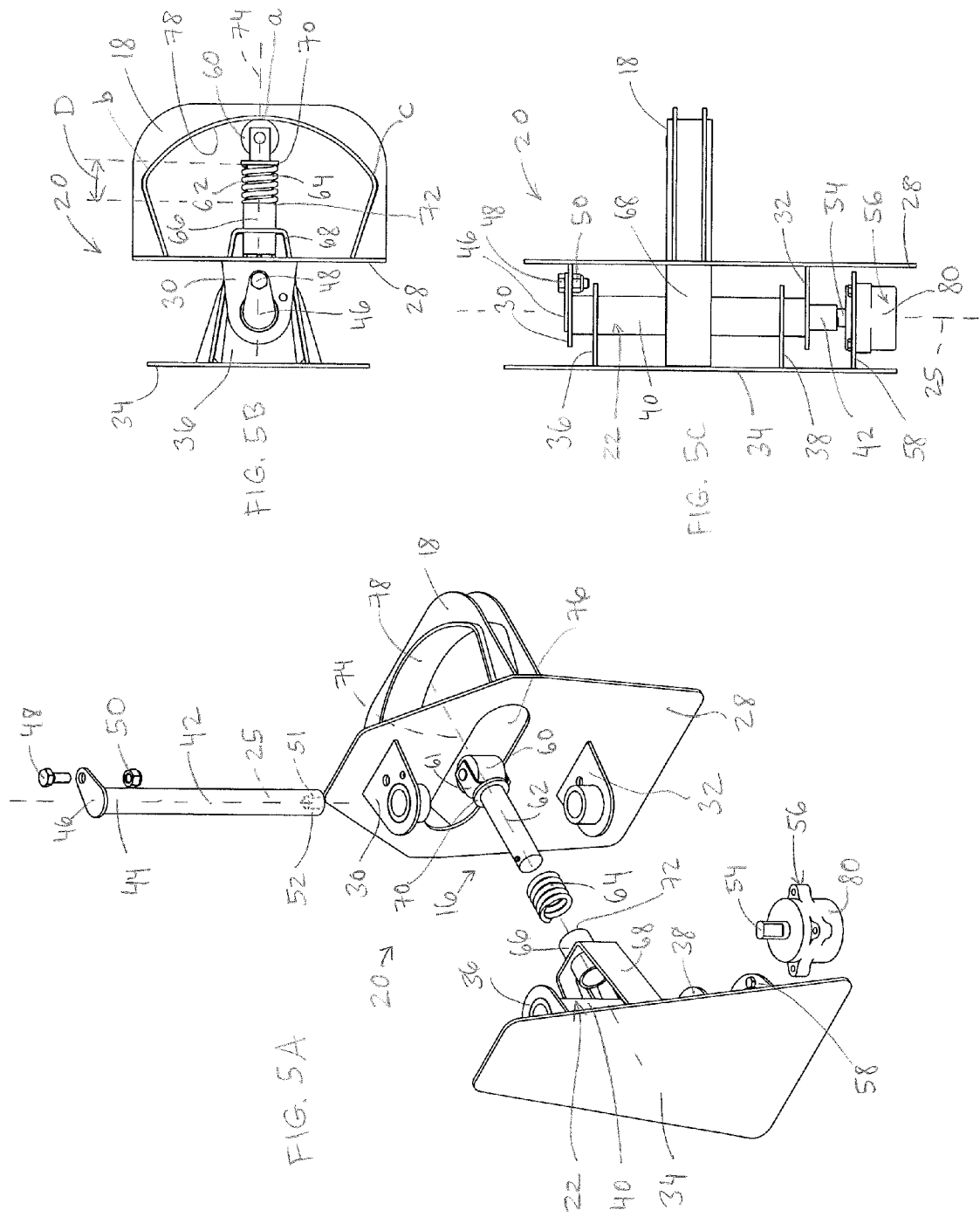

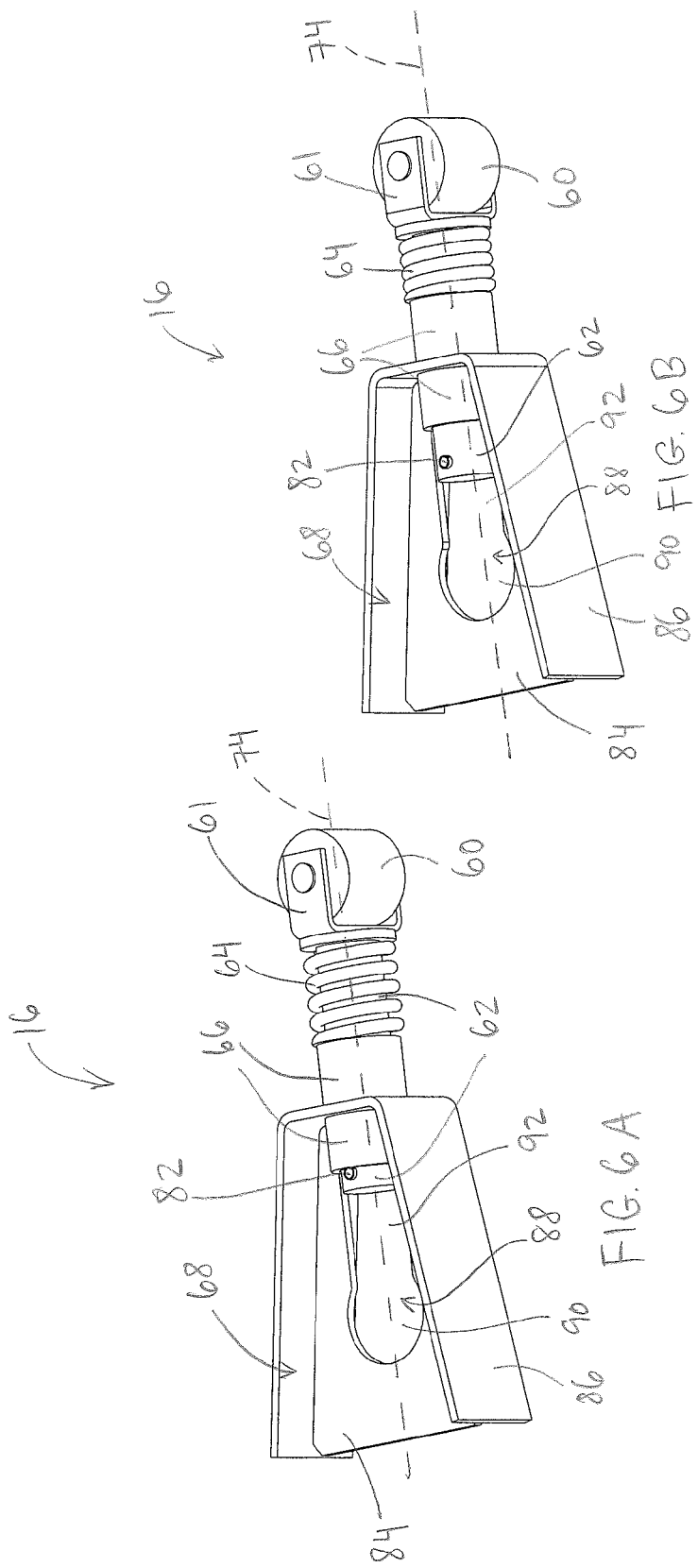

ABSTRACT

BI-DIRECTIONAL BREAK-AWAY BOOM WITH ROLLER AND ROTARY DAMPER

CROSS REFERENCE TO RELATED APPLICATION

This application claims priority to U.S. Provisional Application No. 61/888,140, filed Oct. 8, 2013, entitled "BI-DIRECTIONAL BREAK-AWAY BOOM WITH ROLLER AND ROTARY DAMPER" which is hereby incorporated by reference in its entirety.

BACKGROUND OF THE INVENTION

1. Field of Invention

This invention relates generally to agricultural sprayers, and more particularly to a break-away boom arm for an agricultural sprayer.

2. Description of Related Art

A crop sprayer may be in the form of an agricultural vehicle or may be mounted to an agricultural vehicle. The crop sprayer may spray a fluid including herbicides, pesticides, and fertilizers on agricultural crops in a field. The fluid may be sprayed from nozzles mounted on a boom on the crop sprayer. Large agricultural sprayers typically have horizontal booms to allow for extensive spray coverage of crops in a field with a single travel pass. In some cases, booms have a length between about 20 and about 150 feet.

With conventional crop sprayers, an operator may drive the crop sprayer forward in a field. As the crop sprayer moves in the field, the boom (or more specifically, a boom tip) may impact an obstacle (such as a tree, power pole, fence or post, for example), or force may otherwise be applied to the boom. This impact or force may damage the boom, the boom tip and/or the obstacle.

In some commercially produced chemical application booms, the boom tips are configured to break away rearwardly as the sprayer moves forward. However, in some cases, such as when the sprayer travels backward, the boom encounters an obstacle wherein it is pushed forwardly. Many boom tips are not designed to break away forwardly; thus, the boom may sustain extensive damage.

SUMMARY

In one aspect, a break-away apparatus for a boom arm comprising a main boom portion and a boom tip is disclosed. The apparatus is positioned at a joint between the main boom portion and the boom tip. The apparatus allows the boom tip to assume a neutral position and to pivot to a forward position and to a rearward position with respect to the main boom portion. The apparatus comprises a first plate disposed at the joint; a second plate disposed at the joint; a hinge assembly positioned between the first plate and the second plate; a cam element attached to the first plate, the cam element comprising an arcuate surface; and a roller attached to the second plate and positioned to roll against the arcuate surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter.

Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 1A is a top plan view of an exemplary boom arm in a forward break configuration, as if mounted on an implement traveling in direction T.

FIG. 1B is a top plan view of an exemplary boom arm in a rearward break configuration, as if mounted on an implement traveling in direction T.

FIG. 1C is an enlarged view of the circle 1C in FIG. 1B.

FIG. 2A is a side elevation view of the exemplary boom.

FIG. 2B is an enlarged view of the circle 2B in FIG. 2A.

FIG. 2C is a top plan view of the area of the circle 2B in FIG. 2A.

FIG. 3A is a top perspective view of the exemplary boom in a forward break configuration, as if mounted on an implement traveling in direction T.

FIG. 3B is an enlarged view of the encircled area of FIG. 3A.

FIG. 4A is a top perspective view of the exemplary boom in a rearward break configuration, as if mounted on an implement traveling in direction T.

FIG. 4B is an enlarged view of the encircled area of FIG. 4A.

FIG. 5A is an exploded perspective view of an exemplary breakaway joint in the boom of FIGS. 1A-4B.

FIG. 5B is a top plan view of the joint of FIG. 5A.

FIG. 5C is a side elevation view of the joint of FIG. 5B.

FIG. 6A is a top perspective view of a roller arm in an extended position relative to its mounting bracket.

FIG. 6B is a top perspective view of a roller arm in a compressed position relative to its mounting bracket.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

A break-away assembly of the present disclosure allows a boom tip to break away to the rear or front of the agricultural vehicle without damaging the agricultural vehicle or the boom arm when the boom tip impacts an obstacle or when a sufficient force is otherwise be applied to the boom tip. Release of the boom tip diminishes the stress placed on the boom arm and mounting apparatus.

A boom arm with a bi-directional boom-tip break-away feature is described that can be used, for example, on liquid sprayers. A suitable liquid sprayer is disclosed in U.S. Patent Application Publication No. 2012/0237284, assigned to AGCO Corporation, and entitled "Boom fore and aft break-away assembly," the disclosure of which is fully incorporated by reference herein. Another suitable liquid sprayer is disclosed in U.S. Pat. No. 7,823,803, assigned to AGCO Corporation, and entitled "Integrated breakaway cylinder and method for constructing a boom assembly," the disclosure of which is fully incorporated by reference herein. A boom arm of the present disclosure may be attached to a liquid sprayer by conventional means.

An exemplary break-away boom arm of the present disclosure allows the boom tips to hinge back or forward when coming in contact with an obstruction in the field. In one embodiment, the boom tip is connected to the main boom portion by a central hinge assembly; a spring-loaded roller rides a cam support as the boom tip pivots with respect to the main boom portion. A rotary damper is used in an embodiment to bring the tip back to center from either forward or rearward movement. The rotary damper controls the speed at which the boom tip comes back into the neutral position.

FIG. 1A is a top plan view of an exemplary boom arm 10 in a forward break configuration, with boom tip 12 pivoted forward from main boom portion 14. In an exemplary embodiment, boom arm 10 is a truss assembly of aluminum pieces; boom arm 10 supports a plurality of liquid spray nozzles (not shown). FIG. 1B is a top plan view of boom arm 10 in a rearward break configuration, with boom tip 12 pivoted rearward from main boom portion 14. FIG. 1C is an enlarged view of the circled area 1C in FIG. 1B, showing spring loaded roller assembly 16 riding within cam support 18. The structure and operation of the break-away mechanism or apparatus 20 positioned at a joint between main boom portion 14 and boom tip 12 is further described below.

FIG. 2A is a side elevation view of horizontally extending boom arm 10 in a neutral position (i.e., with boom tip 12 not pivoted forward or backward). FIG. 2B is an enlarged view of the circled area 2B in FIG. 2A, showing hinge assembly 22 of break-away mechanism 20. FIG. 2C is a top plan view of break-away mechanism 20, with the top boom cord removed for clarity. In an exemplary embodiment, hinge assembly 22 is not normal or perpendicular with respect to the bottom surface 24 of boom arm 10 (which, when its associated sprayer is disposed on a horizontal surface, is also generally horizontal). Rather, hinge axis 25 of hinge assembly 22 is disposed at an acute angle alpha with respect to a line 26 that is perpendicular to generally horizontally extending bottom surface 24 of boom arm 10. In an exemplary embodiment, alpha is between about 10 degrees and about 20 degrees, and is most suitably about 15 degrees. Because of this inclination, boom tip 12 becomes aligned slightly upward as well as forward (as shown in FIG. 1A) or rearward (as shown in FIG. 1B) relative to main boom portion 14 when pivoted on axis 25. When the obstacle that caused the forward or rearward pivoting of boom tip 12 relative to main boom portion 14 is passed, gravity assists in returning boom tip 12 to the neutral position shown in FIG. 2A. Other angles outside of the 10-20 degree range may be used, but smaller angles will not offer as much gravity assistance for the boom tip return to its unpivoted position, and larger angles will result in additional stresses on hinge assembly 22.

FIG. 3A is a top perspective view of boom arm 10 in a forward break configuration, the top plan view of which is shown in FIG. 1A. FIG. 3B is an enlarged view of circled area 3B in FIG. 3A. FIG. 4A is a top perspective view of boom arm 10 in a rearward break configuration, the top plan view of which is shown in FIG. 1B. FIG. 4B is an enlarged view of circled area 4B in FIG. 4A.

In an exemplary embodiment, main boom portion 14 includes end plate 28, and boom tip 12 includes end plate 34. Hinge assembly 22 is positioned between end plates 28 and 34. While the term "plate" is used, it is to be understood that plates 28 and 24 need not be flat. A cam element is attached to one of the end plates. In an exemplary embodiment, cam support 18 extends substantially perpendicularly from one side of end plate 28 of main boom portion 14. As shown in FIGS. 5A-5C, upper and lower pin holding brackets 30 and 32, respectively, extend from the other side of end plate 28. On the other side of the joint between main boom portion 14 and boom tip 12, end plate 34 is disposed at an end of boom tip 12. Upper and lower brackets 36 and 38 extend from end plate 34 and fixedly support pin sleeve 40, which defines hinge axis 25 and supports hinge pin 42. In an exemplary embodiment, top end 44 of hinge pin 42 includes a plate 46 that is secured to upper pin holding bracket 30 (with, for example, bolt 48 and nut 50, though other fasteners can also or alternatively be used). Thus, hinge pin 42 is fixed to end plate 28. Pin sleeve 40 is dimensioned to allow pin sleeve 40 to rotate around hinge pin 42 about hinge axis 25.

Rotary damper 56 limits free rotation of pin sleeve 40 relative to hinge pin 42. Housing 80 of rotary damper 56 is fixed to bracket 58 of end plate 34 of boom tip 12. Stud 54 of rotary damper 56 has a contour that fits closely within a complimentary bore 51 (see FIG. 5A) in a lower end 52 of hinge pin 42. Thus, housing 80 rotates as boom tip 12 (and therefore end plate 24) pivots relative to end plate 28 of main boom portion 14 about hinge axis 25. However, stud 54 of rotary damper 56 is fixed to hinge pin 42, which in turn is fixed to end plate 28 of main boom portion 14. Rotary damper 56 is configured to control the rate at which stud 54 and housing 80 return to the neutral position (where boom tip 12 is unpivoted relative to main boom portion 14). Rotary damper 56 thereby controls the rate at which the attached boom tip 12 and main boom portion 14 return to the neutral configuration (unpivoted relative to each other). Known rotary dampers may be used, including, for example, model X-CRD, commercially available from Kinetrol LTD of Tulsa, Okla.

Spring loaded roller assembly 16 includes roller 60 rotatably mounted via clevis assembly 61 on an inner end of roller arm 62. In an exemplary embodiment, an outer end of roller arm 62 is inserted into helical spring 64 before insertion into collar 66 of bracket 68. Bracket 68 extends from end plate 34. In an exemplary embodiment, one end of spring 64 acts against flange 70 of roller arm 62 and the other end of spring 64 acts against end face 72 of collar 66. Roller arm 62 is secured within collar 66 so that roller arm 62 can move longitudinally along roller arm axis 74. When break-away mechanism 20 is assembled (see, e.g., FIG. 5B), spring loaded roller assembly 16 extends through aperture 76 of end plate 28 so that roller 60 contacts arcuate rolling surface 78 of cam support 18.

In an exemplary embodiment, arcuate rolling surface 78 is oriented so that roller arm 62 moves in a plane substantially perpendicular to hinge axis 25. In an exemplary embodiment, a distance D along axis 74 between flange 70 and end face 72 is at a maximum when the break-away mechanism 20 is in the neutral configuration illustrated at FIGS. 2A, 2C, 5B and 5C. In either of the forward break configuration (shown in FIGS. 1A, 3A and 3B) or the rearward break configuration (shown in FIGS. 1B, 1C, 4A and 4B), helical spring 64 is compressed as the distance D, decreases, along axis 74 between flange 70 and end face 72. Such a decrease occurs upon movement of roller 60 along rolling surface 78 from the center of arcuate rolling surface 78 (shown at point a in FIG. 5B) toward either end of arcuate rolling surface 78 (shown as roller end points b and c in FIG. 5B; see also FIGS. 1C and 3B). Point a is further from axis 25 than points b and c, with points b and c being the same distance from axis 25. In the disclosed design, when roller 60 is not centered upon rolling surface 78, compressed helical spring 64 exerts a recovery force on break-away mechanism 20 to increase the distance along axis 74 between flange 70 and end 72, thereby returning roller 60 to the center position of rolling surface 78. In an exemplary embodiment, rotary damper 56 controls (i.e., dampens) the speed at which roller 60 returns to the center position upon rolling surface 78 (point a), thereby controlling the speed at which boom tip 12 comes back into its neutral position relative to main boom portion 14.

In the disclosed embodiment, hinge pin 42 is securely held by brackets 30, 32, 36, 38 and pin sleeve 40. Moreover, spring loaded roller assembly 16 is securely held by bracket 68. Roller arm 62 axially slides along roller arm axis 74 relative to collar 66 of bracket 68. Thus, even with the relative pivoting motion of end plate 34 of boom tip 12 with respect to end plate 28 of main boom portion 14 about hinge axis 25 (as boom tip 12 breaks away forwardly or rearwardly), roller 60 remains reliably in contact with rolling surface 78 of cam support 18.

FIG. 6A is a top perspective view of roller arm 62 in an extended position relative to its mounting bracket, such as when roller 60 is at position a on rolling surface 78. FIG. 6B is a top perspective view of a roller arm in a compressed position relative to its mounting bracket, such as when roller 60 is at position b or c on rolling surface 78. Collar 66, which is fixed to bracket 68, serves as a guide to keep the longitudinal sliding motion of roller arm 62 aligned along roller arm axis 74. Roller pin 82 serves as a stop to prevent roller arm 62 from falling out of collar 62. In an exemplary embodiment, bracket 68 has an I-beam type construction with web plate 84 partially surrounded by flange 86. Web plate 84 includes aperture 88 having a rounded portion 90 for passage of pin sleeve 40 and a slot portion 92 for receiving roller arm 62. Slot portion 92 is long enough that a gap remains between roller arm 62 and pin sleeve 40, so that there is no interference with the pivoting of pin sleeve 40 or the sliding of roller arm 62. This construction of bracket 68 results in a very strong structure that can accommodate the forces of the moving boom tip 12 relative to main boom portion 14.

While a particular configuration of break-away mechanism 20 is described, it is contemplated that variations may be made. For example, a biasing mechanism other than a helical spring may be used to bias roller 60 against roller surface 78. Also, while a particular arrangement of elements is shown, it is contemplated that parts of a break-away mechanism may be assembled otherwise.

Although the subject of this disclosure has been described with reference to several embodiments, workers skilled in the art will recognize that changes may be made in form and detail without departing from the spirit and scope of the disclosure. For example, while the illustrated embodiment shows a structure in which cam support 18 is attached to main boom portion 14 and roller 60 is attached to boom tip 12, it is contemplated that the converse may also be used. In that case, cam support 18 would be attached to boom tip 12 and roller 60 may be attached to main boom portion 14.

What is claimed is:

1. A boom arm with break-away apparatus, the boom arm comprising a main boom portion and a boom tip, the break-away apparatus being positioned between the main boom portion and the boom tip, the break-away apparatus comprising:

a first plate and attached to one of the main boom portion and the boom tip, the first plate having an aperture formed therein;

a second plate and attached to the other of the main boom portion and the boom tip;

a hinge assembly positioned between the first plate and the second plate, the hinge assembly configured to allow the boom tip to assume a neutral position and to pivot to a forward position and to a rearward position with respect to the main boom portion;

a cam element attached to the first plate, the cam element comprising an arcuate surface, the cam element being attached such that the cam element extends from a side of the first plate facing away from the second plate;

a roller attached to the second plate with a roller arm and positioned to roll against the arcuate surface, wherein the roller arm extends through the aperture to position the roller against the arcuate surface of the cam element; and a helical spring biasing element configured to bias the roller against the arcuate surface, wherein the helical spring surrounds at least a portion of the roller arm and is disposed in compression between a flange of the roller arm and an end surface element attached to the second plate.

2. The boom arm with break-away apparatus of claim 1 wherein:

the first plate is attached to the main boom portion; and
the second plate is attached to the boom tip.

3. The boom arm with break-away apparatus of claim 1 wherein the hinge assembly comprises a hinge pin at least partially surrounded by a hinge sleeve.

4. The boom arm with break-away apparatus of claim 1 wherein the cam element is a cam support that extends substantially perpendicularly from the first plate.

5. The boom arm with break-away apparatus of claim 1 wherein the roller travels in a plane substantially perpendicular to the first plate.

6. The boom arm with break-away apparatus of claim 1 wherein the hinge assembly is tilted at an acute angle to a direction that is perpendicular to a bottom surface of the boom arm.

7. The boom arm with break-away apparatus of claim 1 wherein the boom tip pivots upwardly when the hinge assembly pivots forward or rearward.

8. The boom arm with break-away apparatus of claim 1 wherein the hinge assembly further comprises a rotary damper, wherein the first plate and the second plate assume a first position relative to each other when the boom tip assumes a neutral position with respect to the main boom portion, and wherein the first and second plates change position relative to each other as the roller rolls against the arcuate surface, and wherein the rotary damper controls return of the first plate and the second plates plate to the first position.

9. The boom arm with break-away apparatus of claim 8 wherein a housing of the rotary damper is attached to the second plate, and the hinge assembly further comprises a hinge pin, and wherein a stud of the rotary damper is fixed to the hinge pin.

10. The boom arm with break-away apparatus of claim 9 wherein the hinge pin is fixed to the first plate.

11. The boom arm with break-away apparatus of claim 1, wherein a distance between the flange and the end surface element is greater when the boom tip is in the neutral position than when the boom tip is in the forward position or the rearward position.

* * * * *